C. M. GAGE.
PROCESS OF TREATING CONTAINERS OF FIBROUS MATERIAL.
APPLICATION FILED SEPT. 8, 1910.
1,007,086.
Patented Oct. 31, 1911.
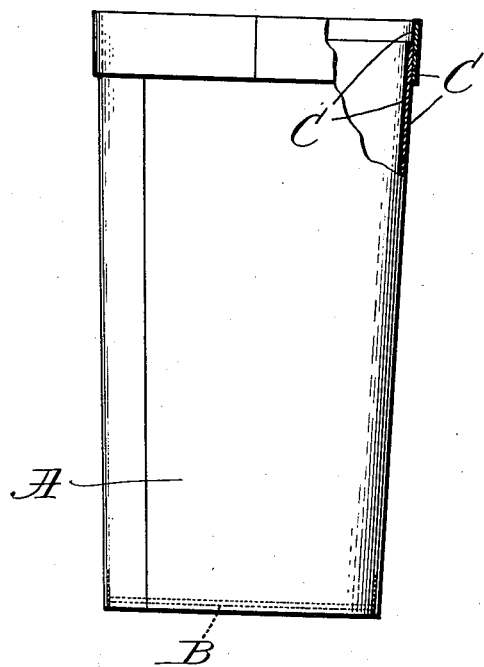
Witnesses:
Fred. S. Greenleaf
George V. Ward.
Inventor.
Charles M. Gage,
by Crosby & Gregory
attys.

UNITED STATES PATENT OFFICE.

CHARLES M. GAGE, OF EAST PEPPERELL, MASSACHUSETTS, ASSIGNOR OF ONE-FOURTH TO EBEN B. PHILLIPS AND ONE-FOURTH TO THOMAS F. GRAHAM, BOTH OF EAST PEPPERELL, MASSACHUSETTS.

PROCESS FOR TREATING CONTAINERS OF FIBROUS MATERIAL.

1,007,086. Specification of Letters Patent. Patented Oct. 31, 1911.

Application filed September 8, 1910. Serial No. 580,949.

*To all whom it may concern:*

Be it known that I, CHARLES M. GAGE, a citizen of the United States, and resident of East Pepperell, county of Middlesex, State of Massachusetts, have invented an Improvement in Processes for Treating Containers of Fibrous Material, of which the following description, in connection with the accompanying drawing, is a specification, like characters on the drawing representing like parts.

This invention relates to containers made of fibrous material, for holding milk, oysters, and other liquid or semi-liquid commodities, such containers in practice being made of heavy spruce or other wood fiber paper formed into suitable shapes.

At present the containers are dipped in a bath of fused waxy material, usually paraffin, at a temperature of about 212° F. remaining in the bath some little time, after which they are removed and placed in a hot chamber to remove excess paraffin and allow it to thoroughly penetrate or saturate the paper. These so-called "single service" containers are light, strong and so cheap that they can be used with economy but once, as the commercial appellation indicates, but while they are very successful they are open to certain objections. When used as milk bottles the containers above described will slightly taint the milk if kept for a few hours, because the paraffin has so penetrated the fibrous structure of the container that the milk will come in contact with exposed portions of the fiber and a very noticeable taste thereof is imparted to the milk. Furthermore, while containers as now constructed will hold liquids for some hours without leaking or softening they will both soften and leak if the liquid remains in them for from eight to ten hours.

In my efforts to overcome these objectionable features and to improve containers of the character specified I have discovered that highly satisfactory results can be attained by coating the container in its permanent form with waxy material, such as paraffin, in a highly fused condition, and then immediately chilling the container while the coating is hot and before impregnation of the container by the coating material. By this mode of treatment the fused material is not permitted to thoroughly penetrate and saturate the fibrous material of the container, but instead it forms a thin, continuous and smooth surface coating or skin coat thereon, the chilling serving to harden such coating so that it has a glazed or enameled appearance, with a high polish. This continuous coating is impervious to moisture, and as the coating completely covers the surface of the container it is interposed between the latter and the contents, so that there is not the slightest taint or taste imparted to such contents, no matter how delicate or susceptible to taint.

Milk, probably the most delicate of all food products in this respect, can be kept indefinitely in a container embodying my invention and will remain absolutely fresh, pure and untainted.

The glazed or enamel-like surface coating which I obtain by my process of treatment is smooth, continuous, hard and glass-like in appearance, and absolutely waterproof, and in a measure resembles the high glaze on china. By treating the container in its permanent form I obviate any tendency to crack, split, or injure the coating thereof after the chilling step of the process.

The drawing represents in side elevation and partly broken out a container having a coating applied thereto in accordance with my invention.

Herein the container A is shown as slightly conical in shape, designed for holding milk or other liquids, and in practice is made of fibrous material, such as heavy spruce or other wood-fiber paper, having a bottom B, see dotted lines, fixed in place in any suitable manner.

In accordance with my invention the container in its permanent form is coated by dipping or completely immersing it in a bath of the waxy coating material, preferably paraffin, which I prefer to maintain at a temperature of from 240° to 250° F. in order that the surplus will run off quickly and freely after the container is removed from the coating bath. This not only economizes the coating material, but it also shortens the time requisite for coating, for I find that a thorough immersion or dipping is all that is necessary, the container being removed from the coating bath immediately after it has been thoroughly covered, and before the coating can impregnate or saturate the fibrous material of the container. While the coating is hot and fluid, that is, in a few seconds after removal from the coating bath, only sufficient to permit the removal of surplus coating material, I suddenly chill such coating by quickly reducing the temperature thereof, as by a cold air blast, by placing the container with its hot coating in a cold air box or chamber, or by dipping or immersion in cold water. This latter mode of treatment is preferable as it is cheap, convenient, and rapid, and the chilling is uniform and effected simultaneously over all portions of the coating. The chilling step of the process instantly hardens the hot and fluid coating, and imparts to it a smooth, continuous glazed or enameled appearance, such coating being moisture-proof and impervious to the passage of liquids. At the same time the coating is sufficiently elastic and flexible to withstand ordinary knocks or blows without cranking or losing its continuity. The chilling step follows so closely upon the coating step that the coating has no opportunity or time to penetrate or impregnate to any extent the body of the container walls, and hence it completely covers and protects the container and prevents contact of any portion of its surface with the contents, forming what may be termed a skin coat thereupon. That is, no portion of the fibrous material of which the container is made can contact with the contents because of the interposed thin, elastic and glazed surface coating.

In the drawing I have endeavored to indicate by a heavy black line C the surface coating, in accordance with my present invention.

The particular shape of the container is immaterial, so long as it is treated in its permanent form, and various changes or modifications in details of procedure may be made by those skilled in the art without departing from the spirit and scope of my invention as set forth in the claims hereto annexed.

Having fully described my invention, what I claim as new and desire to secure by Letters Patent is:—

1. The herein described process in the manufacture of containers of fibrous material, which consists in completely immersing the container in its permanent form in a bath of moisture-repellant material in fused conditon, to coat the entire surface of the container therewith, removing the coated container before impregnation thereof by the coating material, and immediately and quickly chilling the container while its coating is in fused condition, to thereby harden the same and provide the entire surface of the container with a smooth, enamel-like and continuous coating impervious to moisture.

2. The herein described process in the manufacture of containers of fibrous material, which consists in completely immersing the container in its permanent form in a bath of melted paraffin, to coat the entire surface of the container, removing the coated container before impregnation thereof by the paraffin, and immersing the same immediately in a cooling bath while the coating is hot and fluid, to thereby suddenly chill and harden such coating and provide a smooth, flexible and continuous enamel-like and moisture-resisting skin coat over the entire surface of the container.

In testimony whereof, I have signed my name to this specification, in the presence of two subscribing witnesses.

CHARLES M. GAGE.

Witnesses:
 WM. A. SHEPARDSON,
 OTTO K. SHATTUCK.